Dec. 27, 1938.    R. C. RUSSELL    2,141,697
STEERING MECHANISM
Filed March 15, 1935    5 Sheets-Sheet 1
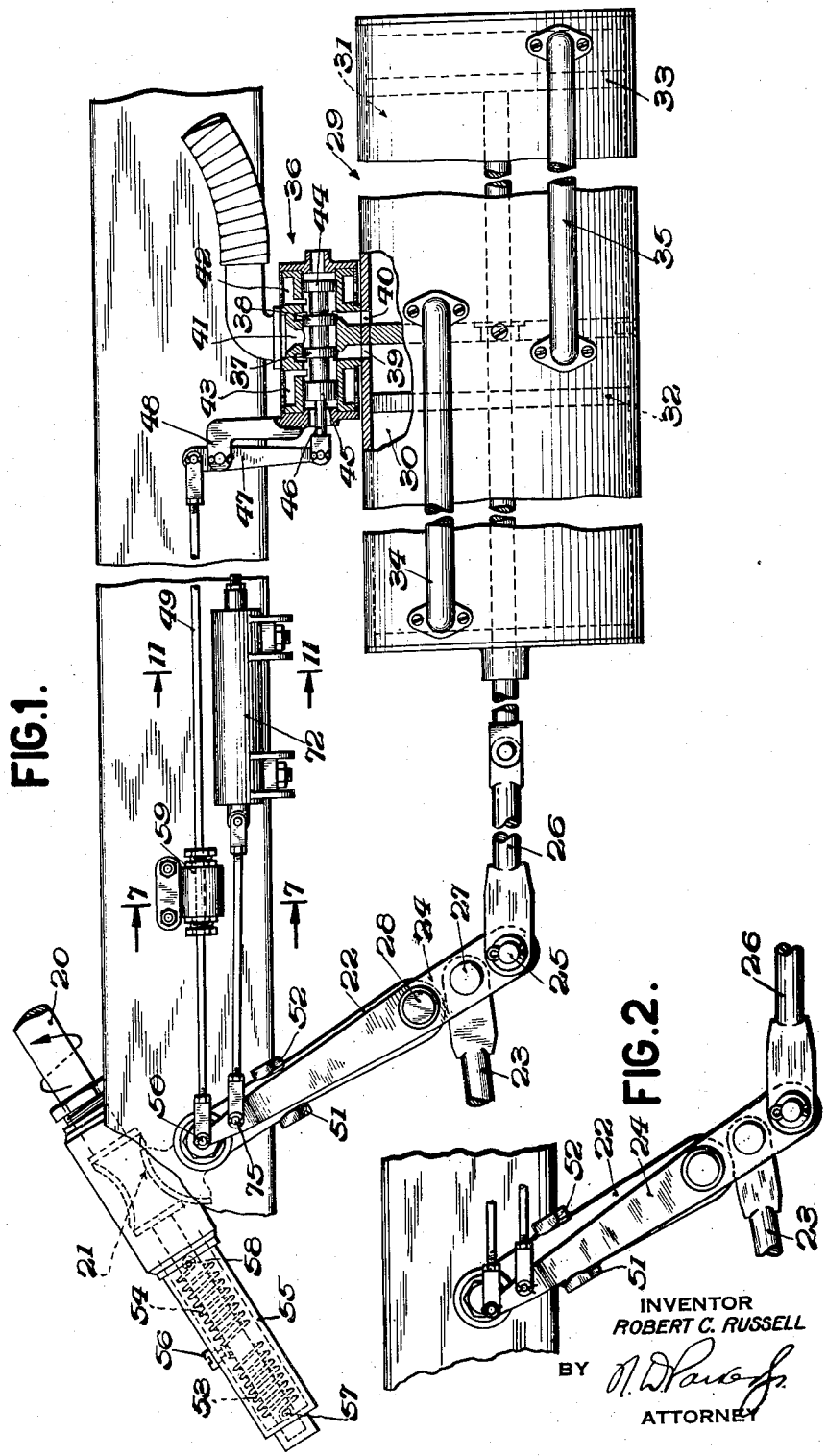
INVENTOR
ROBERT C. RUSSELL
BY
ATTORNEY

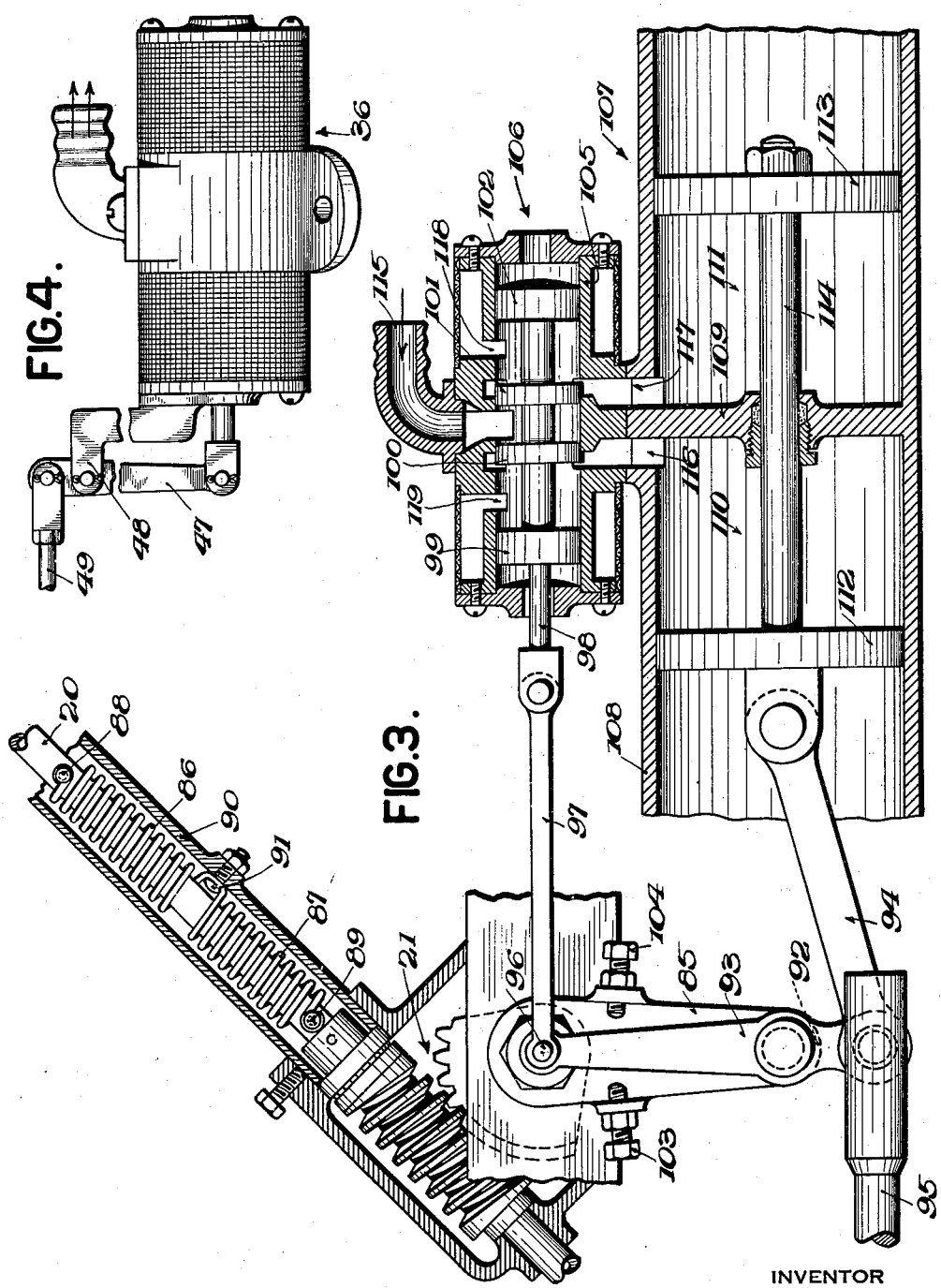

Dec. 27, 1938.   R. C. RUSSELL   2,141,697
STEERING MECHANISM
Filed March 15, 1935   5 Sheets-Sheet 3
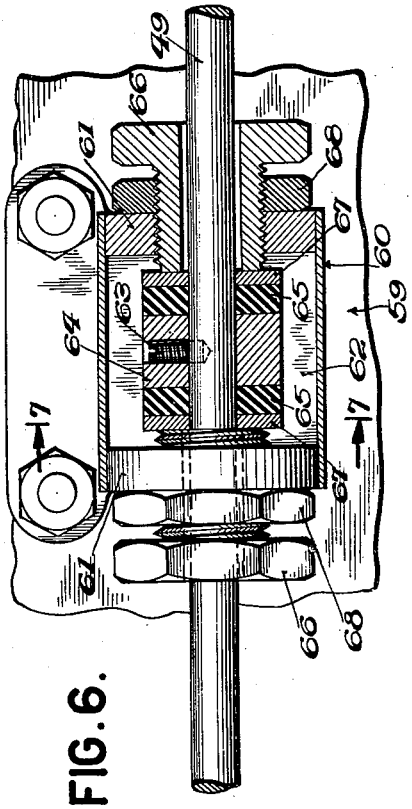
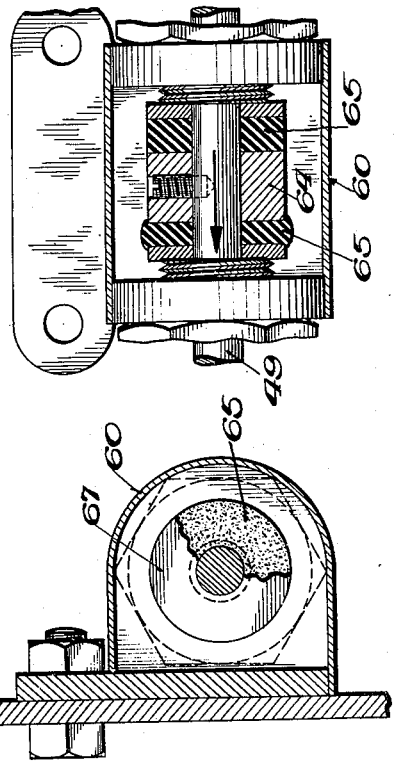
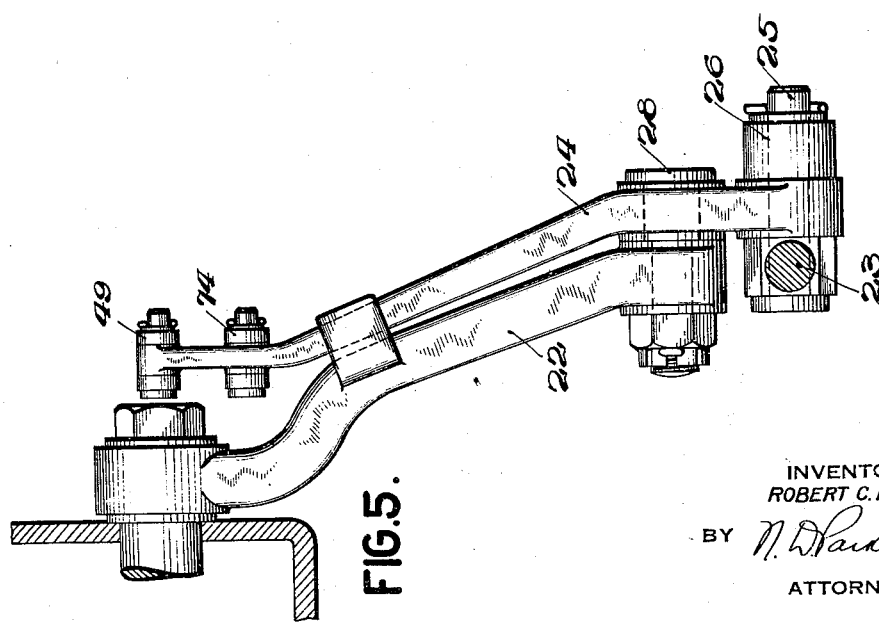
INVENTOR
ROBERT C. RUSSELL
BY
ATTORNEY Dec. 27, 1938.                R. C. RUSSELL                2,141,697
                           STEERING MECHANISM
                         Filed March 15, 1935          5 Sheets-Sheet 4
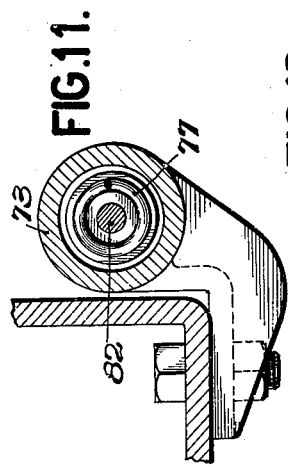
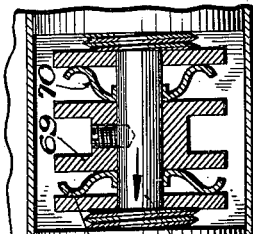
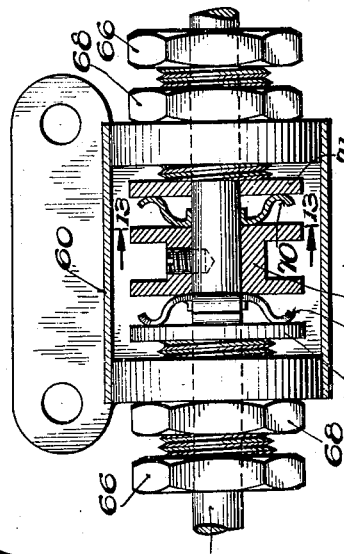
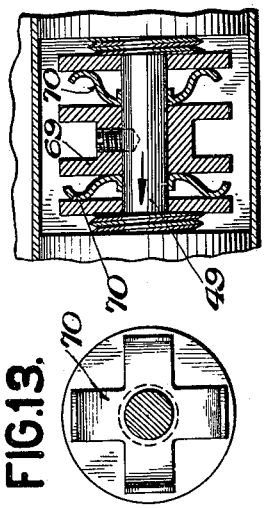
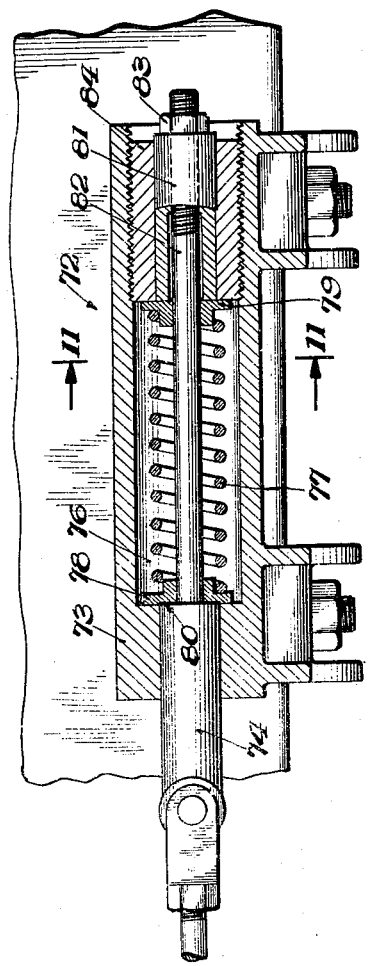
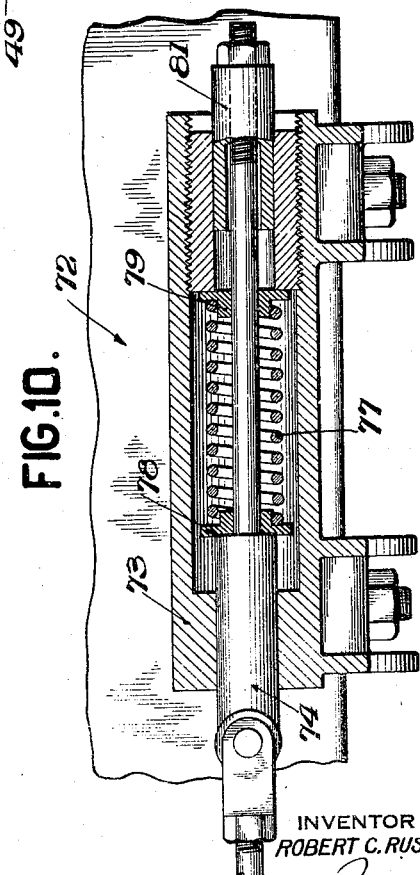
INVENTOR
ROBERT C. RUSSELL
BY
ATTORNEY

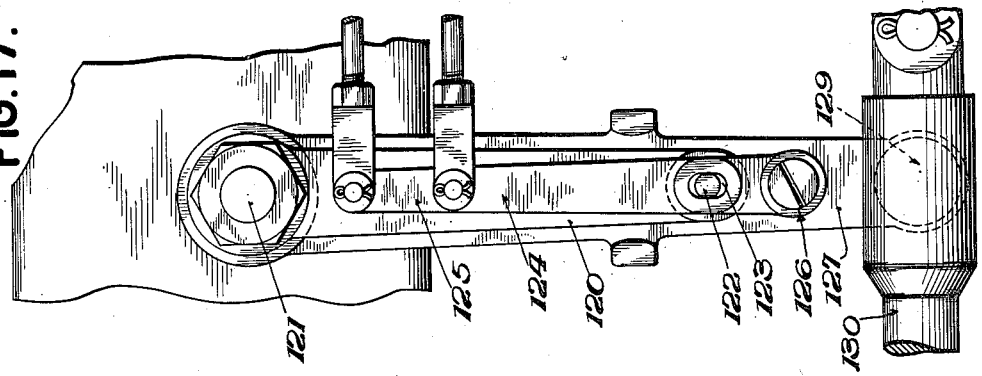
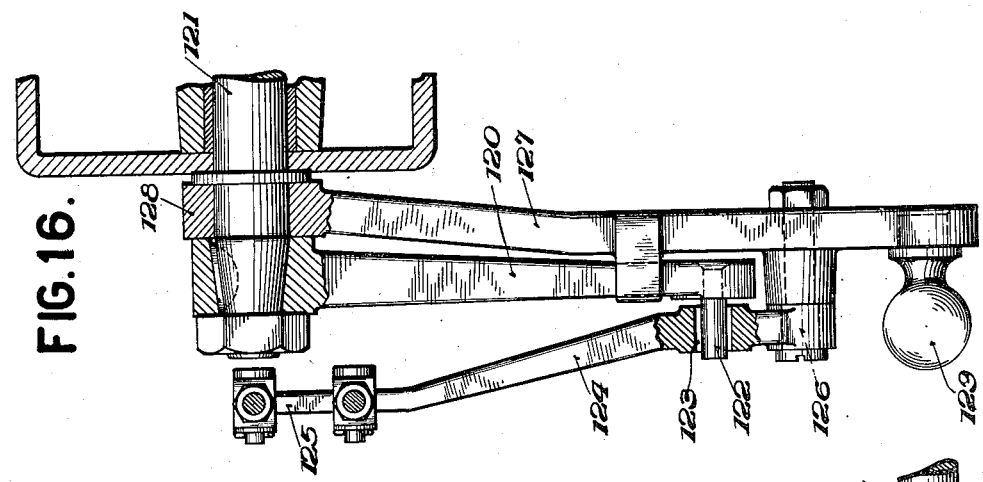
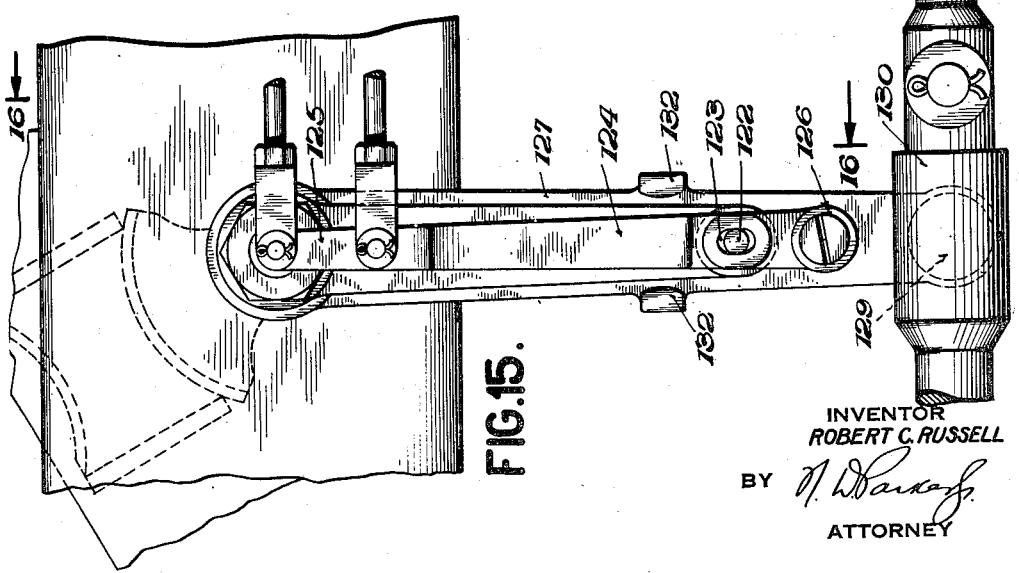

Patented Dec. 27, 1938

2,141,697

UNITED STATES PATENT OFFICE 2,141,697

STEERING MECHANISM

Robert C. Russell, Cleveland, Ohio, assignor to Bendix-Westinghouse Automotive Air Brake Company, Pittsburgh, Pa., a corporation of Delaware Application March 15, 1935, Serial No. 11,325

3 Claims. (Cl. 180—79.2)

This invention relates to steering mechanism for motor vehicles such as automobiles, trucks, busses and the like, and more particularly it relates to power-operated or servo motor-controlled steering mechanism.

One of the objects of the present invention is to provide in a power-operated vehicle steering mechanism a novel servo motor and valve control means therefor together with novel amplifying means interposed between the valve means and the vehicle operator and between the steerable ground wheels of the vehicle and the valve means, together with novel centralizing and damping means so constituted as to stabilize and more efficiently control the operation of the valve means employed, in order to properly govern the action of the servo motor which operates to steer the steerable wheels of the vehicle.

Another object of the invention is to provide, in a construction of the above character, a novel valve-centralizing and valve-damping means whereby the operation of the valve will be efficiently stabilized and any tendency of the valve mechanism to fluctuate, thereby effecting reciprocation of the servo motor, will be eliminated.

A further object is to provide a novel combined power and manual steering mechanism of such character that the steerable wheels of the vehicle are constantly under manual control of the operator in the event the servo motor or power steering mechanism fails to function properly.

Still another object is to provide novel centralizing means for the manually-operated steering column of a vehicle which may be advantageously employed in either a power steering or manual steering installation and which is effective to return the manually-operated steering column to normal position upon release of manually-applied power thereto.

A still further object is to provide a novel arrangement of parts which is so constituted as to produce an unusually efficient and positively-operated power steering mechanism and one which is capable of ready installation upon existing types of vehicles.

Other objects and novel features of the invention will appear more fully hereinafter from the following detailed description when taken in connection with the accompanying drawings. It is to be expressly understood, however, that the drawings are employed for illustrative purposes only and are not designed as a definition of the limits of the invention, reference being had for this purpose to the appended claims.

In the drawings:

Fig. 1 illustrates a side view of a power steering mechanism constructed in accordance with the present invention as applied to a motor vehicle, a fragment of the frame of the latter being illustrated in side elevation;

Fig. 2 is a side view of certain of the parts shown in Fig. 1 and illustrating the position of the valve-controlling lever in making a turn in one direction;

Fig. 3 is a side view, partly in section, of a slightly modified form of the invention adapted for use with fluid under pressure;

Fig. 4 is a side view of the valve-housing and valve-actuating levers employed in connection with that form of the invention shown in Fig. 1;

Fig. 5 is an end view of a steering arm construction similar to that shown in Fig. 1 with the exception that the drag link connection is aligned with the power connection;

Fig. 6 is a longitudinal section through the damping centralizer associated with the valve-operating mechanism of Fig. 1;

Fig. 7 is a section taken on line 7—7 of Fig. 6;

Fig. 8 is a view similar to Fig. 6 but illustrating the position of the parts when the centralizer is in one of its operative positions;

Fig. 9 is a longitudinal section of the valve-centralizing spring assembly employed in connection with the device of Fig. 1;

Fig. 10 is a longitudinal section of the valve-centralizing spring assembly in one of its operative positions;

Fig. 11 is a section on the line 11—11 of Fig. 9;

Figs. 12, 13 and 14 illustrate a modified form of damping centralizer employing a spring construction;

Figs. 15 and 16 illustrate a slightly modified form of steering arm construction, and Fig. 17 is a modified form of the steering arm construction shown in Figs. 15 and 16.

Referring more particularly to Fig. 1 of the drawings, the present invention is illustrated therein as including a manually-operable steering column 20, which may be rotated by any suitable operator-controlled means, not shown, and which is connected through the usual worm and sector gear arrangement 21 to a steering arm 22, the connections being such that upon rotation of the steering column in either direction, arm 22 will be oscillated about its upper end as a pivot. A drag link or other steering element 23 is employed for connection with the dirigible or steerable wheels of the vehicle, and this link is operatively connected with the arm 22 through the medium of a combined valve-controlling and power-operated lever 24, the lower end of the latter being pivotally connected as at 25 to a power-operated piston rod 26 and the connection between the lever 24 and link 23 being indicated at 27 and being positioned intermediate the connection 25 and a connection 28 between the arm 22 and lever 24.

Novel means are employed for effecting power operation of the piston rod 26, and in the form shown, such means comprise a vacuum-operated double cylinder 29 divided into two compartments 30 and 31, in each of which is disposed a piston 32 and 33, each of said pistons being mounted upon the common piston rod 26. As shown, corresponding end portions of each compartment are interconnected by means of conduits 34 and 35, this construction enabling the use of a simple valve mechanism for controlling the flow of motive fluid into one compartment only, the said fluid being conducted to the other compartment through said conduits.

As heretofore pointed out, the servo motor 29 is adapted to be vacuum operated, as for example, by the vacuum obtainable from the vehicle intake manifold, and in order to control the passage of motive fluid to and from said motor, a valve mechanism 36 is employed, the same including a reciprocable element having valve heads 37, 38 formed thereon and adapted to control the passage of motive fluid through ports 39 and 40 respectively. In the position shown in Fig. 1, the valve elements 37 and 38 are shown in their normal position connecting chambers 30 and 31 with atmosphere, but it will be apparent that when said elements are moved to the left, as viewed in this figure, then the port 39 leading to compartment 30 will be in communication with suction inlet 41 while the port 40 of the compartment 31 will continue to be in communication with atmospheric outlet opening 42. With the valve assembly moved to the right, as viewed in Fig. 1, port 40 will be connected with the suction inlet 41 while port 39 will continue to be in communication with atmospheric opening 43. The valve mechanism is preferably provided with suitable sealing members or heads 44 and 45 and all of the heads 37, 38, 44 and 45 are carried by a reciprocable valve-operating stem 46, pivotally connected at one end to a lever 47, which latter is pivotally mounted intermediate its ends upon a stationary extension 48 of the valve housing. The other end of the lever 47 is pivotally connected to a valve-operating link 49, which latter is operatively connected to the upper extremity of the valve-controlling lever 24 as indicated at 50.

With the above arrangement, it will be readily perceived that in the event the steering column 20 is rotated in such a manner as to effect clockwise movement of arm 22, the lever 24 will be moved counterclockwise about the connection 27 as a pivot, as shown in Fig. 2, a predetermined distance as determined by abutments 51 and 52 carried by the arm 22 and provided for arresting relative pivotal movement between said arm and lever. Such operation will effect movement of the valve-controlling link 49 to the left, as viewed in Fig. 1, to move the valve stem 46 to the right, thus admitting vacuum power through ports 41 and 40 into the chamber 31 and through conduit 34 into chamber 30. The piston assembly 32, 33 will then be moved to the left by reason of the pressure differential on opposite sides thereof, such movement being effective to move the piston rod 26 and drag link 23 to the left to effect the desired angle of turn. It will be observed in this connection that such movement of the piston rod 26 tends to rotate the valve-controlling lever 24 in a clockwise direction about pivot 28 in such a manner as to effect a return of lever 24 to aligned position with respect to arm 22, as shown in Fig. 1, which is effective to lap the valve mechanism and discontinue further power operation of the steering mechanism. In order to overcome this reaction to maintain the valve mechanism in operation, it is necessary to apply manual power to the steering column. Such applied power will be proportional to the power exerted by the servo motor 29 and hence the operator will experience a feel or reaction to steering which is directly proportional to the power utilized for steering purposes.

One of the features of the present invention resides in the provision of means associated with the steering mechanism for returning the same to normal position, that is with the steerable wheels directed straight ahead, upon release of the manual effort exerted by the operator. Such an arrangement is employed in connection with the construction shown in Fig. 1 and includes oppositely-wound resilient devices such as springs 53 and 54, one end of each of these springs being connected to a stationary portion of the steering gear housing 55 as by means of a screw 56, while the other ends 57 and 58 are respectively connected to an extension of the steering column 20. The construction of springs 53 and 54 is such that with the steerable wheels in straight-ahead position, the steering column 20 remains motionless. However, upon rotation of the column in either direction, the springs will be tensioned to such a degree that upon release of the manual power, the steering column will be returned to normal position. It will be apparent that this arrangement can be employed in manually-operated steering constructions as well as power-operated mechanisms and materially aids the operator in efficiently steering the vehicle. In the present installation, that is in a power steering mechanism, the springs may be relatively light since their function is to reverse the position of the valve-controlling lever 24 in order to reverse the action of the valve mechanism 36 and the servo motor 29 for the purpose of returning the steering mechanism to straight-ahead position through the action of the servo motor.

In order to eliminate the possibility of reversal of the valve mechanism 36 during operation of the mechanism above described which might occur through road shocks being transmitted to said mechanism through the drag link 23 and lever 24, a novel valve-centralizing or damping mechanism 59 is employed in connection with the valve-controlling link 49, and the construction of this device is such that reciprocatory movement of the said link will be quickly and efficiently damped. As shown more particularly in Figs. 6, 7 and 8, such device comprises a casing 60 suitably secured to the vehicle frame and being provided with end closure members 61, the latter, together with the casing, defining a chamber 62. The link 49 extends through the casing and carries thereon, with the chamber 62, as by means of set screw 63, a collar 64, on either side of which rubber disks 65 are disposed, each of these disks being preferably initially precompressed to any desired degree as by means of adjusting screws 66 threadedly received by the end members 61. Washers 67 are interposed between the screws 66 and the rubber disks, and preferably the adjusting screws are provided with lock nuts 68 in order to securely maintain the screws in adjusted position.

With the above arrangement, reciprocatory movement of the valve-controlling link 49 will effect a compression of one or the other of the rubber disks 65 and a corresponding expansion of the remaining disk, Fig. 8 disclosing the condition of the said disks upon a movement of link 49 to the left. The rubber disks, however, possess the ability to absorb energy during compression but will not rebound or impart to the link 49 the same force required to compress them, by reason of the fact that a certain portion of the initial force is dissipated by friction of the rubber fiber of the washer in expanding. In other words, the rubber disks function as an energy-absorbing device and will quickly damp any tendency of the valve-operating link to reciprocate due to road shocks which would otherwise oscillate the valve mechanism to effect reciprocation of the servo motor.

A slightly modified form of damping centralizing device is disclosed in Figs. 12, 13 and 14, and in this construction, the arrangement is similar to that heretofore described with the exception that spring means are employed in lieu of rubber disks. As shown in these figures, the link 49 has secured thereto a collar 69 upon either side of which is disposed a pronged spring member 70, said members being confined between the collar 69 and washers 71 as by means of the adjustable screws 66. The springs 70 function in a manner similar to the rubber disks 65 since a large amount of the initial force imparted to the springs during initial movement of the link 49 will be absorbed by the friction between said springs, the collar 69 and washers 71. Fig. 14 discloses the arrangement of the parts upon movement of link 49 to the left, it being clearly illustrated that the left spring 70 is compressed while the right spring 70 is permitted to expand.

Also associated with the valve mechanism shown in Fig. 1 and preferably directly connected with the valve-operating lever 24, is a valve-centralizing device 72 which not only functions to eliminate slack and looseness in the operating connections but also serves to dampen any oscillating tendencies which may be imparted to the valve-controlling lever 24. As shown more particularly in Figs. 9 and 10, this device comprises a casing 73 secured to the vehicle frame in any suitable manner and adapted to receive a rod 74, one end of which is operatively connected to the valve-operating lever 24 at 75. The casing 73 is provided with an enlarged chamber 76 in which a spring 77 is disposed encircling the rod 74, the ends of said spring abutting washers 78 and 79 loosely surrounding the rod 74. The washer 78, as shown, abuts a shoulder 80 on said rod as well as the casing 73, while the washer 79 abuts the inner end of a sleeve 81 which surrounds the reduced end 82 of the rod 74 and which may be adjusted relatively thereto as by means of a nut 83. The spring 77 when assembled is initially placed under any desired degree of initial compression and in order to effect the initial adjustment, a plug 84 is threadedly received by one end of the casing 73 and abuts the washer 79.

From the above construction, it will be perceived that movement of rod 74 to the right, as viewed in Fig. 10, will compress the spring 77 and as soon as the force required to move rod 74 in such direction is removed, the energy stored in the spring will immediately return the parts to normal position such as shown in Fig. 9, and because of the initial compression of the spring, any tendency for the rod 74 to move further to the left than that indicated in Fig. 9 will be eliminated. It will be also understood that after initial movement of the sleeve 81 and washer 79 contacted thereby to compress the spring 77 in the opposite direction, the parts will be restored to normal position upon release of the initial force on the rod 74.

It will also be perceived from the above that the actuating rod 74 of the device 72 is connected to lever 24 at point 75 which is below point 50, the center of oscillation of the lever system as a whole. Thus the rod 74 is moved by angular movement of the lever system in either direction from the normal position, and hence the spring 77 is compressed to a degree proportional to the angle of steering. Such an arrangement tends to reverse the action of the valve device 36 to automatically return the lever system to neutral position and likewise return the steerable wheels of the vehicle to a straight path, in the event that the operator relinquishes control of the steering shaft 20.

Referring more particularly to Fig. 3, a slightly modified form of power steering mechanism is disclosed therein which is adapted for operation in connection with a fluid under pressure. As shown in this figure, the steering column 20 is connected to a manually-operable oscillatable arm 85, as by means of the usual worm and worm gear connections 21 and a steering column centralizing device comprising oppositely-wound springs 86 and 87 is associated with the steering column through connections 88 and 89 and with a stationary casing 90 through a connection 91. The operation of this mechanism is similar to the springs 53 and 54 heretofore described in connection with Fig. 1.

The manually-operable arm 85 is pivotally connected at its lower end 92 with a combined valve-controlling and power-operated lever 93, the connection being made intermediate the ends of said lever. The lower end of the latter is connected with a power-operated piston rod 94 as well as a drag link 95 while the upper end of the lever is pivotally connected as at 96 with a valve-operating link 97, the latter being directly secured to a valve stem 98 carrying valve heads 99, 100, 101 and 102. Relative oscillatory movement between the lever 93 and arm 85 is limited by means of adjustable stops 103 and 104 suitably carried by ears provided on the manually-operable arm.

The valve heads heretofore described, in combination with a casing 105, form a valve mechanism 106 for controlling the flow of pressure fluid to and from a servo motor 107 in order to effect power operation of the vehicle steering mechanism. As shown, the servo motor comprises a cylinder 108 having a partition 109 therein dividing the cylinder into two compartments 110 and 111, each of these compartments containing a piston 112 and 113 respectively interconnected by means of a rod 114 and connected with the lever 93 through the rod 94. The valve mechanism is provided with an intake 115 through which air under pressure from any suitable source is adapted to be conducted to either of the compartments 110 or 111 by means of ports 116 and 117, while exhaust openings 118 and 119 are provided for exhausting one compartment while the other is being supplied with fluid power. Both compartments are, as shown, normally open to exhaust. It will be readily understood from the above that should arm 85 be moved in a clockwise direction about its upper end as a pivot, then counterclockwise movement of lever 93 will take place about the pivotal connection between said lever and the lower end of the arm 85 as well as about the pivotal connection between said lever and piston rod 94 and link 95 to effect opening of the port 116 to the intake 115, the port 117 continuing to be open to the atmospheric opening 118. Movement of the piston assembly of the servo motor to the left will then take place which will effect power operation of the drag link 95 and in addition thereto tend to effect clockwise movement of the lever 93 to cause a lapping of the valve mechanism such as disclosed in Fig. 3. The valve mechanism will not be lapped, however, until manual effort tending to oscillate the member 85 is arrested. Upon release of manually-applied power to the steering column 20, the springs 86 and 87 will serve to return the steering column to normal position and reverse the action of the valve mechanism 106 through arm 85, lever 93 and link 97 to return the steerable wheels to normal position by means of the reversed operation of the servo motor. Preferably, corresponding end portions of the compartments 110 and 111 are interconnected as by means of suitable conduits, not shown, in a manner similar to that indicated in Fig. 1.

The lever construction shown in Fig. 5 is similar to that shown in Fig. 1 with the exception that the drag link connection 23, instead of being connected to the lever 24 intermediate the connections 28 and 25, is connected to said lever at the lower extremity thereof.

A slightly modified form of leverage arrangement which may be substituted for that shown in Fig. 1 is disclosed in Figs. 15 and 16 and includes a manually-operable member 120 drivably secured to a rotatable steering shaft 121 at its upper end thereof and carrying a pin 122 at its lower end adapted to be received in an elongated slot 123 formed in a valve-controlling lever 124 intermediate the ends of the latter. The upper end 125 of the lever 124 is adapted to be connected with suitable valve mechanism, as shown in Fig. 1, while the lower end thereof is pivotally connected as at 126 to a power-operated pitman arm 127, the upper end of said arm having a hub portion 128 journaled upon the shaft 121 and having its lower extremity 129 pivotally connected to a drag link 130 and a power-operated piston rod 131. Preferably, the arm 127 is provided with abutments 132, so positioned as to limit the relative movement between member 120 and arm 127 when the former is oscillated to effect operation of the valve-controlling lever 124 in opposite directions.

In Fig. 17, the lever arrangement shown therein is similar to that illustrated in Figs. 15 and 16 with the exception that the upper end 125 of the valve-controlling lever 124 is not coaxially arranged with respect to the upper ends of member 120 and arm 127.

From the foregoing, it will be readily perceived that in accordance with the present invention, there has been provided a vehicle power steering mechanism capable of use in connection with vacuum or pressure power fluid and one in which the arrangement of parts is such that manual steering may be effected in the event of failure of the power apparatus. It will be also understood that the steering column centering means employed is of material assistance to an operator and affords a simple and effective device by which the steering mechanism may be automatically centered after a vehicle turn has been made, while the valve-centralizing and damping devices enable efficient stabilization of the power device and avoid reciprocating tendencies in the power system. The various steering arm and power-controlling lever assemblies are of compact and rugged nature and serve to readily adapt the invention to existing types of steering mechanisms without the necessity of extensively rearranging the parts thereof.

While several embodiments of the invention have been disclosed and described herein with considerable particularity, it is to be understood that the invention is not restricted thereto as the same is capable of receiving a variety of mechanical expressions, some of which will now readily suggest themselves to those skilled in the art, while changes may be made in the details of construction, arrangement and proportion of parts, and certain features used without others, without departing from the spirit of the invention. Reference is, therefore, to be had to the claims hereto appended for a definition of the limits of the invention.

What is claimed is:

1. A power steering mechanism for vehicles comprising a manually-operable steering arm, a steering device, a power-operated member, valve means for controlling the application of power to said member, and means for controlling the operation of said valve means including a valve-controlling lever connected at one end thereof to said valve means and at the other end thereof to said power-operated member and being pivotally connected intermediate its ends with said steering arm, said steering device being connected with said lever intermediate said last two named connections.

2. A power steering mechanism for vehicles comprising an oscillatable steering arm, a control lever pivotally connected intermediate its ends to the free end of said arm, a power device connected with one end of said lever, valve means for controlling said power device operatively connected with the other end of said lever, and a steering connection pivotally connected with said lever intermediate said first two named connections.

3. A power steering mechanism for vehicles comprising an oscillatable steering arm, a control lever pivotally connected intermediate its ends to the free end of said arm, a power device connected with one end of said lever, valve means for controlling said power device operatively connected with the other end of said lever, a steering connection pivotally connected with said lever intermediate said first two named connections, and means carried by said arm for positively limiting relative pivotal movement of said lever with respect to said arm.

ROBERT C. RUSSELL.